United States Patent [19]

Geiersbach et al.

[11] Patent Number: 4,555,725
[45] Date of Patent: Nov. 26, 1985

[54] AGRICULTURAL IMPLEMENT STEERING GUIDANCE SYSTEM AND METHOD

[75] Inventors: Allois F. Geiersbach, Milwaukee, Wis.; David L. Murray, La Porte, Ind.

[73] Assignee: Deutz-Allis Corporation, Milwaukee, Wis.

[21] Appl. No.: 526,080

[22] Filed: Aug. 24, 1983

[51] Int. Cl.[4] .............................................. H04N 7/18
[52] U.S. Cl. ...................................... 358/93; 358/103; 358/108
[58] Field of Search .................. 358/93, 103, 107, 108

[56] References Cited
U.S. PATENT DOCUMENTS

| | | | |
|---|---|---|---|
| 3,530,235 | 9/1970 | Bolton | 358/103 |
| 4,211,921 | 7/1980 | Kanetou | 180/169 |
| 4,214,266 | 7/1980 | Myers | 358/108 |
| 4,288,814 | 8/1981 | Talley | 358/93 |
| 4,299,483 | 11/1981 | Groue | 358/103 |
| 4,365,268 | 12/1982 | Allen | 358/108 |

Primary Examiner—Howard W. Britton
Attorney, Agent, or Firm—Charles L. Schwab

[57] ABSTRACT

A video guidance system for visually displaying a row mark traced on the surface of a field during a previous traverse to the operator of a farm tractor pulling a planter has left and right row markers depending respectively from opposite outer sides of the planter for tracing row marks on the field; a video monitor on the tractor in the field of view of the operator; left and right video cameras mounted on the planter adjacent the outer edges thereof with the optical axis of each camera directed forwardly and inclined at a slight angle to the horizontal so that it images a substantial length of a row mark traced on a previous swath; and switch means for selectively connecting the video monitor to the left or to the right video cameras, whereby each scanning line of the video monitor raster creates a different spot on the image of the substantial length of the sensed row mark and such spots on successive scanning lines of the monitor raster are images of points spaced apart in said sensed row mark so the spots on the multiplicity of scanning lines forms an elongated steering vector which indicates to the tractor operator the direction the tractor is to be steered in order to maintain constant and consistent spacing between rows sown during successive swaths.

8 Claims, 4 Drawing Figures

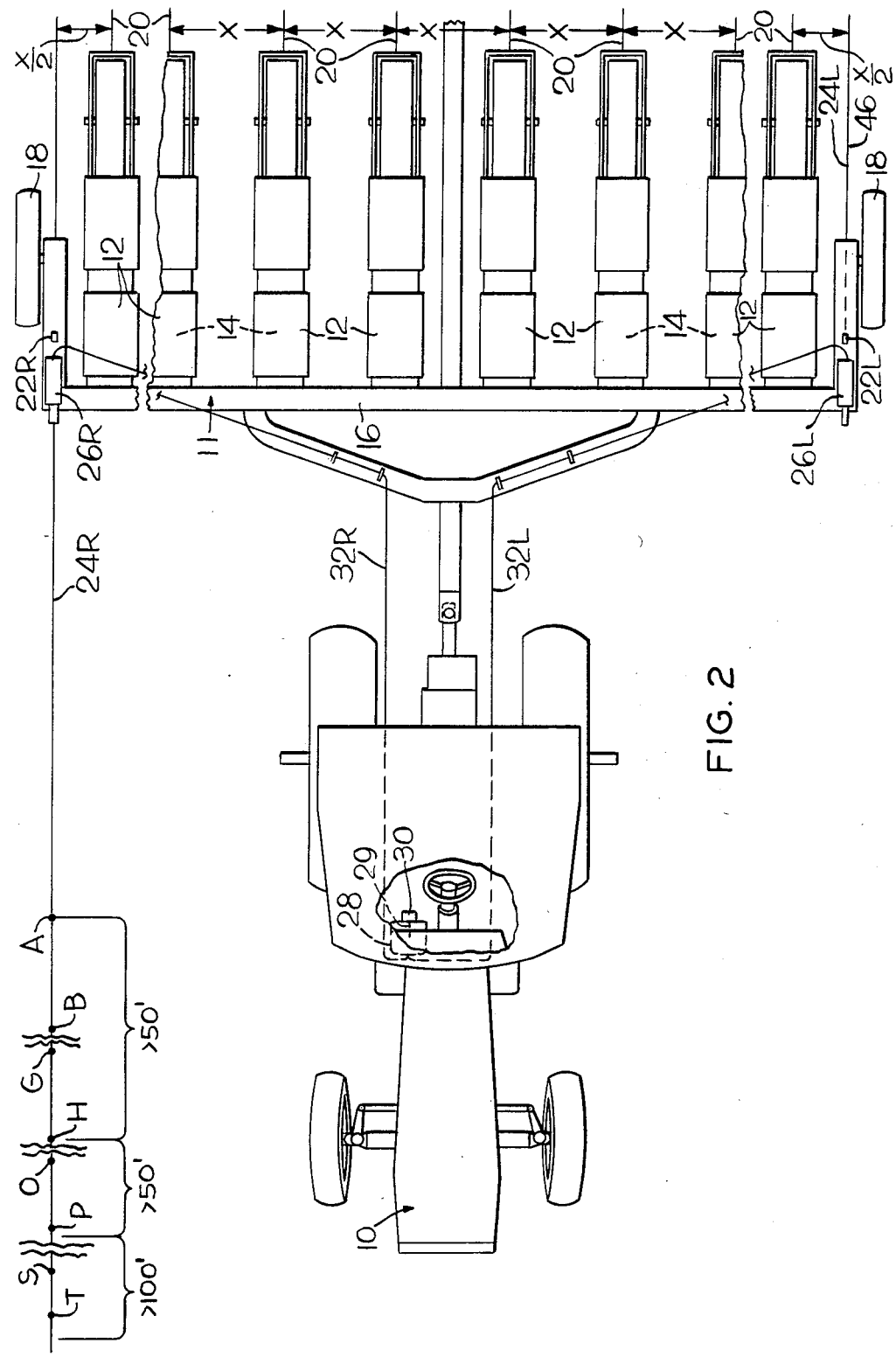

AGRICULTURAL IMPLEMENT STEERING GUIDANCE SYSTEM AND METHOD

BACKGROUND OF THE INVENTION

This invention relates to agricultural implements in general and more particularly to a guidance system and method for steering a mobile farming implement along row mark or other identifying markings on the surface of a field.

It is necessary in many farming operations for the operator of a mobile farming implement to traverse a field in equally spaced apart swaths. For example, during planting the farmer must plant in adjacent swaths with constant space between adjacent rows so that during cultivating the cultivator teeth can be easily and consistently guided to engage the ground between the growing plants. Conventionally row markets are pivotally attached adjacent both outer edges of a planter which comprise elongated arms adapted to be alternately raised and lowered with each having a blade or other suitable device at the distal end thereof for tracing a row mark on the surface of the field. The row mark represents the position for the center line of the tractor or one of its steering wheels when the operator turns the tractor 180° to plant, or bed rows in the opposite direction.

As the vehicle operator makes one swath through the field, he will position one of two row markers which is located on the side of the planter nearest a previously unworked swath so as to leave a mark on the surface of the ground parallel to the path of the implement. At the end of the field the direction of the implement is reversed so as to work the next unworked soil surface and with the tractor pulling the planter following the previous row mark left by the row marker. When the end of the field is again reached, the implement is turned around and the operator will raise the previously lowered marker and lower the opposing marker so as to engage the unworked surface adjacent the swath next to the worked. The planter is again propelled by the tractor across the field with the opposite row marker tracing the untreated surface of the ground as the tractor pulling the planter follows the previous row mark. This alternating process is continued until the field is completely worked.

The row markers are bulky and relatively expensive, and the hydraulic mechanisms for alternately raising and lowering them are complicated. With a twenty-four row planter, the implement width is approximately 60 feet. Thus the row marker must extend approximately 30 feet from each extremity of the tractor. Such row markers present problems. In the elevated position they may engage utility or telephone lines. Also, the operator must stop or slow down the tractor while alternatelty raising and lowering the row markets. Further, due to the length of the markers, unusually high stresses are placed on the pivot members, thereby causing repair problems.

Optical guidance systems are also known for mobile farming implements which visually display information to the implement operator to assist him in steering the vehicle in accordance with identifying markings on the field such as a crop furrow or the boundary between worked and unworked portions of the field. U.S. Pat. No. 4,365,268 to Allen et al discloses a video tractor-planter guidance system wherein a TV camera pivotally mounted at one end of a planter views a row mark created in the soil by a previous pass of the planter, the image of the row mark is viewed by the tractor operator from a TV monitor on the tractor, and automatic control mechanism is provided for adjusting the horizontal angle of the TV camera so it is always aiming in a dirction parallel to the direction of travel of the tractor. U.S. Pat. No. 4,211,921 to Kanetou et al discloses a sensor having means for taking an optical image of the boundary between worked and unworked portions of the field, a plurality of photoelectric elements arrayed in a direction perpendicular the image of the boundary, and camera means for compressing the optical image and projecting it on the array of photoelectric elements so that the position of the implement relative to the boundary can be determined from comparison of the photoelectric outputs from the elements. U.S. Pat. No. 4,288,814 to Talley et al discloses a furrow following optical guidance system wherein a rearward viewing video camera views the area of the ground beneath the vehicle and displays the furrow to the vehicle operator on a video monitor so that he can adjust the vehicle steering wheel to maintain the tire imprint in the middle of the furrow viewed by the TV camera. The disadvantage of such known optical guidance systems is that they view the identifying marking, i.e., the furrow or the row mark or the boundary between and unworked portions of the field, from a single spot only and provide no steering information to the vehicle operator as to the direction of the identifying marking ahead of such single spot.

OBJECTS OF THE INVENTION

It is an object of the invention to provide an improved video guidance system and method for eliminating bulky and expensive row markers and for displaying a row mark or other indicating marking on the field to the operator of a mobile farming implement in the form of a steering vector indicating the direction for the implement to be steered in order to traverse the desired swath.

It is a further object of the invention to provide such an improved video guidance system which eliminates the lengthy row markers and displays to the implement operator along a substantial height of the raster of a video monitor a multiplicity of points widely spaced apart on a row mark, which points form a steering vector that informs the operator the direction that the implement is to be steered in order to traverse the desired swath.

Another object is to provide such improved visual guidance system and method which eliminates the lengthy and bulky row markets and displays along a substantial height of the raster of a video monitor to the implement operator substantially the entire length of the row mark in front of the implement in the form of a steering vector which informs the operator both where the implement currently is situated relative to the row mark and also the direction the implement should be steered to follow the row mark and traverse the desired swath.

SUMMARY OF THE INVENTION

A preferred embodiment of a video guidance system in accordance with the invention for visually displaying a substantial length of a row mark on the surface of a field to the operator of a mobile farm implement in the form of an elongated steering vector has left and right row marker means adjacent the outer extremities of the implement for tracing row marks on the surface of the field parallel to the path of the vehicle; a video monitor in the field of view of the operator; left and right video cameras adjacent the outer extremities of the implement with the optical axis of each directed forwardly and inclined at a slight angle to the horizontal so that it images a substantial length of a row mark in front of the implement traced during a previous traverse of the field; and switch means for selecticely connecting the video monitor to the left or to the right video camera, whereby each scanning line of the video monitor raster creates a different spot on the image of such substantially length of the sensed row mark on said monitor, and the multiplicity of spots created by the monitor raster scanning lines along a substantial height of the raster form a steering vector which indicates to the operator the direction the implement is to be steered in order to traverse the desired swath with constant and consistent spacing between rows of successive swaths.

In a preferred method of the invention for visually displaying an elongated indicating marking on the surface of a field to the operator of a mobile farm implement in the form of an elongated steering vector along a substantial height of the raster of a TV monitor to indicate the path to steer the implement in order to traverse the desired swath which will maintain constant and consistent spacing between rows, the improvement comprises the steps of imaging a substantial length of said indicating marking forwardly of said implement on a video camera at a slight angle to the horizontal from a position adjacent an outer extremity of said implement, and displaying the image of said substantial length of said indicating marking along a substantial height of the raster of the video monitor, whereby each scanning line of the video monitor raster creates a spot representing a different point on said substantial length of sensed indicating marking and the multiplicity of points created by said raster scanning lines forms an elongated steering vector indicating the direction the implement is to be steered in order to traverse the desired swath.

BRIEF DESCRIPTION OF THE DRAWINGS

FIG. 2 is a top view of the tractor and planter shown in FIG. 1;

DETAILED DESCRIPTION OF PREFERRED EMBODIMENT

Figure 1:
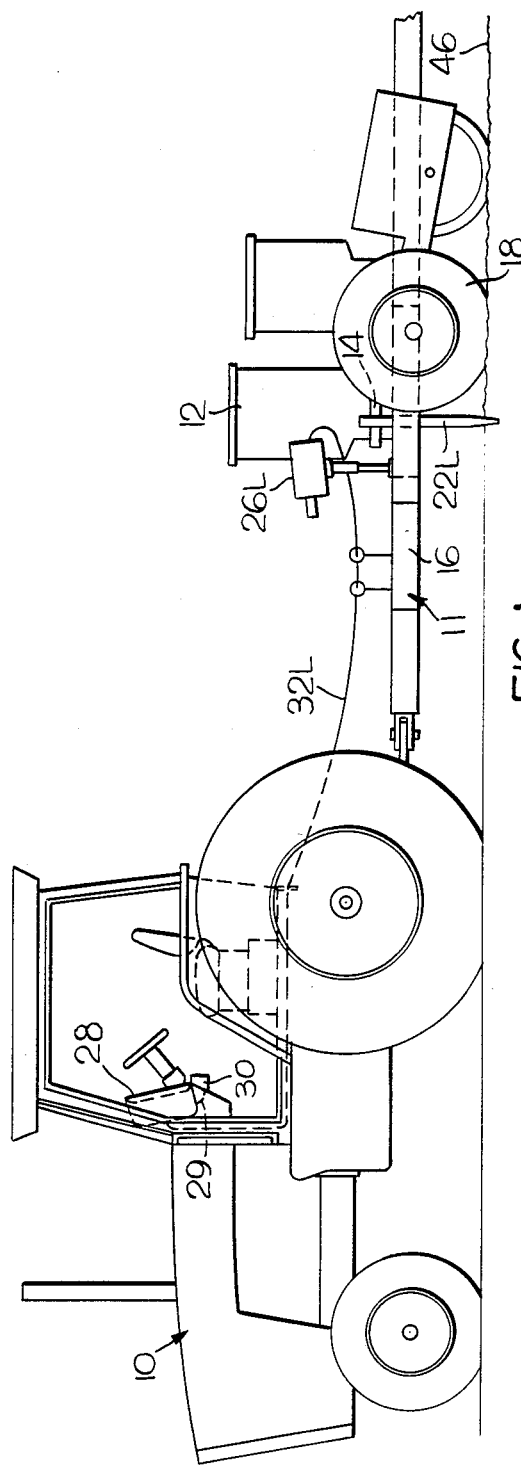
FIG. 1 is a side view of a tractor pulling a planter embodying a visual guidance system in accordance with the invention.

Referring to FIGS. 1 and 2 of the drawing, a tractor 10 pulls a multi-row planter 11 in successive swaths across a field. Planter 11 has a plurality (for example twenty-four) seed hoppers 12 and planting mechanisms 14 (only eight of which are shown in FIG. 2) mounted on a frame 16 which in turn is supported on wheel 18.

Seeds are planted by mechanisms 14 in rows 20 spaced apart by a distance x as planter 11 is pulled in successive swaths across the field. Depending left and right row markets 22L and 22R are supported from frame 16 adjacent the left and right outer extremities thereof respectively and are adapted to cut, or trace row mark furrows such as 24L and 24R respectively as planter 11 is pulled. In the view of FIG. 2, tractor 10 is following row mark 24R which was cut by row marker 22R in the previous swath across the field in the direction from the left to the right of FIG. 2 and row marker 22L is tracing row mark 24L in unworked ground. The operator turns tractor 10 pulling planter 11 around at the end of the field after the swath represented in FIG. 2 and makes a succeeding planting pass, or swath, parallel to and evenly spaced from the previous swath in a direction from the left to the right of FIG. 2 with tractor 10 now following row mark 24L and with right row marker 22R cutting a new row mark (not shown) in unworked soil. It is desirable that the planter 11 traverse the field in equally spaced apart swaths having constant space between adjacent rows 20 of successive swaths so that even cultivating, the teeth of the cultivator can be easily and consistently guided to engage the ground between the growing plants.

Preferably left and right row markers 22L and 22R are spaced from the outboard planting mechanisms 14 by one-half the distance between sown rows 20, i.e., x/2, so that the outboard row 20 planted during one swath in spaced from the outboard row 20 sown in the succeeding swath in the opposite direction by the distance x between rows.

Figure 4:
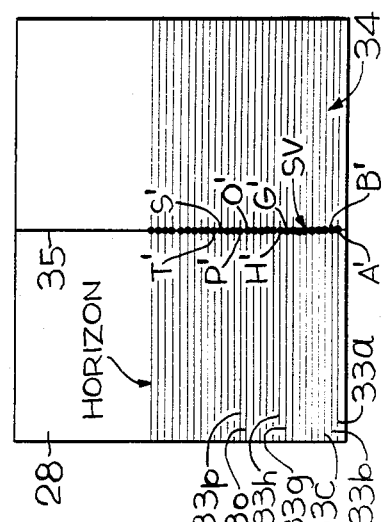
FIG. 4 schematically illustrates the video monitor raster displaying a series of spots on the respective monitor raster scanning lines which are images of spaced apart points along a substantial length of the sensed row mark and together form a steering vector for the tractor and planter to be steered in order to maintain constant spacing between rows sown in successive swaths.

Left and right video cameras 26L and 26R are mounted on the left and right outer extremities respectively of frame 16 so their optical axes are directed forward of the planter and inclined at a slight angle to the horizontal, e.g., 0.5° to 2°, and preferbly each camera views, or images, several hundred feet of the row mark ahead of planter 11. Preferably left and right video camera 26L and 25R are mounted adjacent left and right row markers 22L and 22R, respectively. A video monitor 28 mounted on tractor 10 in view of the tractor operator is connected by a lead 29 to manual camera selector switch 30 which permits the operator to select either the image of video camera 26L to be displayed on monitor 28 through electrical cable 32L or the image of video camera 26R to be displayed thereon through electrical cable 32R. It is illustrated in FIG. 2 that manual switch 30 has been actuated to connect video camera 26R to video monitor 28 which camera 26R is imaging several hundred feet of the length of row mark 24R which was cut on the previous swath. Inasmuch as camera 26R is inclined at a slight angle to the horizontal and views several hundred feet of row mark 24R which is reproduced along a substantial height of the raster 34 of the monitor 28 viewed by the tractor operator, each of the 256 scanning lines 33a, 33b, 33c, etc. (see FIG. 4) of raster 34 appearing on monitor 28 presents an image of a different spot, or point on row mark 24R. Eight different spaced aparts spots, or points A, B, G, H, O, P, S, T are represented on approximately 200 feet of sensed row mark 24R in FIG. 2 as being in the image of camera 26R, and the respective reproductions A', B', G', H', O', P', S', T' of such spots on scanning lines 33 are schematically represented in FIG. 4 as extending along approximately one-half of the height of the raster 34 appearing on monitor 28. It will be appreciated that it is impossible to illustrate all 256 scanning lines 33 of raster 34, and the spots on row mark 24R and their respective reproductions on scanning lines 33 are merely illustrative of such spots. FIG. 2 represents that spots A and B are spaced apart adjacent tractor 10 and their reproductions A', B' appear in FIG. 4 on the two lowest scanning lines 33a and 33b; that spots G and H are spaced approximately 50 feet from spots A and B on row mark 24R and their reproductions G' and H' appear on scanning lines 33g and 33h of FIG. 4; that spots O and P are spaced approximately 50 feet from spots G and H on row mark 24R and their reproductions O' and P' appear on scanning lines 33o and 33p of raster 34 in FIG. 4; and that spots S and T are spaced approximately 100 feet from spots O and P and their reproductions S' and T' appear on scanning lines 33s and 33t of raster 34 in FIG. 4 but appear below the horizon which is also seen on monitor 28. The reproductions of row mark spots such as A', B', G', H', 0', P', S', T' appearing along a substantial height of raster 34 create a steering vector SV which represents to the operator where the planter 11 presently is situated relative to row mark 24R, and the composite of such reproductions forms an elongated steering vector SV in the view of the operator which tells the operator where tractor 10 should be steered to assure that rows 20 in successive swaths are constantly and consistently spaced apart. A vertical line 35 is provided from the top to the bottom of the screen of video monitor 28 midway of the width thereof to assist the operator in keeping steering vector SV in the center of the screen and aligned with the sensed row mark 24R.

Figure 3:
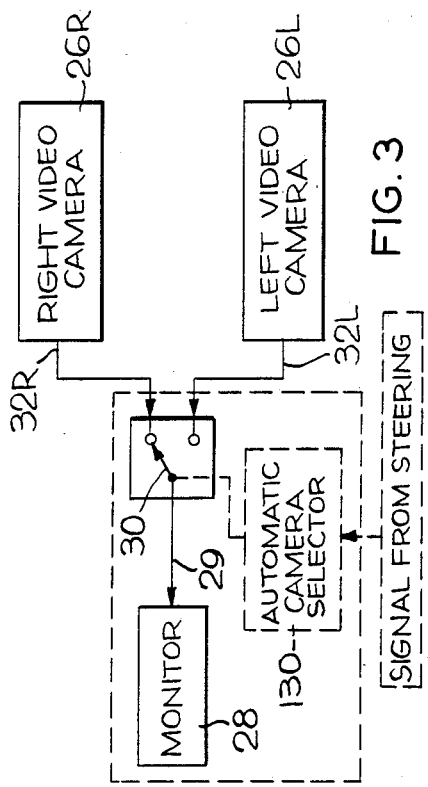
FIG. 3 is a block diagram of switch means for selectively displaying the image of the left mark sensor video camera or the right mark sensor video camera on the video monitor.

It is represented in FIG. 3 that camera selector switch 30 can optionally be automatically actuated to disconnect one video camera 26L or 26R from video monitor 28 and connect the other video camera thereto each time the operator turns the tractor 10 and planter 11 180° at the end of each swath by means of an automatic camera selector 130 shown only as a dashed line block diagram which receives a switching signal from means (not shown) operated by the steering mechanism of tractor 10.

At the end of the swath being traversed as shown in FIG. 2, the operator will make a 180° left turn with tractor 10 and planter 11 and will actuate switch 30 so that video camera 26R is disconnected from monitor 28 and camera 26L is connected to monitor 28 and will view and image furrow 24L as tractor 10 pulls planter 11 in a direction reverse to that illustrated in FIG. 2, i.e., in a direction from the left to the right of FIG. 2 and as row marker 22R is tracing a row mark (not shown) in unworked soil for the succeeding swath.

Since lfet video camera 26L mounted on planter 11 near the left outer extremity of frame 16 has its optical axis inclined at a slight angle to the horizontal, on the subsequent swath camera 26L with image substantially the entire length of row mark 24L ahead of the planter 11 while row marker 22R is tracing a new row mark (not shown) in unworked soil. The image of row mark 24L viewed by camera 26L and displayed on video monitor 28 will appear from the bottom to the horizon on the raster of scanning lines 33 on monitor 28, and since camera 26L views, or images, several hundred feet of row mark 24L ahead of planter 10, a multiplicity of reproductions of spots on row mark 24L will now appear on monitor 28 where each scanning line 33 of the raster views a different point on row mark 24L and creates one point on such scanning line 33. The multiplicity of such points forms an elongated steering vector SV on monitor 28 in view of the planter operator which tells him where to steer tractor 10 in order for the planter to sow seeds in the swath from the left to the right of FIG. 2 with constant and consistent spacing from the rows 20 sown in the previous swath from the right to the left of FIG. 2.

Although the preferred embodiment of the invention has been described as having left and right row markers 22L and 22R and left and right video cameras 26L and 26R which respectively image, or view, row marks 24L and 24R, it will be appreciated that the invention is not so limited and also comprehends a single video camera viewing a single distinctive marking on the field such as a furrow (not shown) or the boundary (not shown) between worked and unworked positions of the field. In such embodiments the row marks 22L and 22R are not required, and only a single video camera, such as 26L or 26R mounted near the outer edge of a mobile farm implement so its optical axis is forwardly directed at a slight angle to the horizontal images or views a substantial distance of a distinctive marking on the field, such as the border between worked and unworked portions of the field, and displays such length of distinctive marking along a substantial height of the raster 34 on a video monitor in the view of the tractor operator. Each scanning line 33 of the monitor raster 34 forms a single spot on the image of the substantial length viewed of such distintive marking, and the composite of such spots creates an elongated steering vector indicating to the operator the direction that the implement is to be steered in order for the implement to traverse the desired swath and maintain constant and consistent spacing between distinctive marking swaths of successive traverses of the field in opposite directions.

The embodiments of the invention in which an exclusive property or privilege is claimed are defined as follows:

1. A method of visually displaying an elongated indicating marking on the surface of a field to an operator at an operator's station on a mobile farm implement to indicate the path to be steered in order for the implement to traverse the desired swath, comprising the steps of imaging a substantial length of said sensed indicating marking forwardly of said operator's station and implement on a video camera at a slight angle to the horizontal from a position adjacent an outer extremity of said implement whereby the image includes the horizon and displaying the image of said substantial length of said indicating marking viewed by said camera along a substantial height of the raster of a video monitor in the field of view of the operator, whereby each scanning line of the video monitor raster below the horizon creates a spot representing a different point on said substantial length of said sensed indicating marking and the multiplicity of points created by said raster scanning lines forms a steering vector extending to the horizon indicating the direction the implement should be steered in order to traverse the desired swath and maintain constant spacing between successive swaths.

2. A method of visually displaying an elongated indicating marking appearing on the surface of a field on a video monitor in the view of an operator at the operator's station on a mobile farm implement to indicate the path for the implement to be steered in order to traverse the desired swaths and maintain constant spacing between successive swaths, comprising the steps of mounting a video camera on said implement adjacent an outer edge thereof so that is optical axis is directed forward of the implement at a slight angle to the horizontal and said camera images the horizon and a substantial length of said sensed indicating marking, and displaying the image viewed by said video camera along a substantial height of the raster of a video monitor in the field of view of the implement operator, whereby each scanning line of the video raster on said monitor below said horizon creates a different point on said image of said substantial length of said indicating marking which is visible to said operator and the multiplicity of said points on said raster scanning lines forms an elongated steering vector extending to the horizon which indicates to the operator where the implement is currently situated relative to said indicating marking and also the direction the implement is to be steered in order to traverse the desired swath.

3. A video guidance system for visually displaying to an operator at the operator's station of a moble farm implement a row mark traced on the surface of the field during a previous traverse of the mobile farm implement comprising: left and right row marker means adjacent the outer extremities respectively of said implement for tracing row marks on the surface of said field in a direction parallel to the path of said vehicle, a video monitor in the field of view of said implement operator, left and right video cameras mounted on said implement adjacent said outer extremities respectively with the optical axis of each said camera directed forwardly and inclined at a slight angle to the horizontal so that is images the horizon and a substantial length of a row mark in front of said implement traced during a previous traverse of the field, and switch means for selectively connecting said video monitor to said left or to said right video camera, whereby each scanning line of the video raster below said horizon on said monitor creates a different spot on said image of said substantial length of said sensed row mark on said monitor which is visible to said operator and the multiplicity of said spots creased by said raster scanning lines forms an elongated steering vector extending to the horizon which indicates to said operator the direction said implement is to be steered in order to traverse the desired swath with constant and consistent spacing between rows sown during successive swaths.

4. In the system of claim 3 wherein said implement comprises a tractor which pulls a planter having a plurality of spaced apart seed planting mechanisms, said row marker means and said video cameras are mounted on said planter, and said video monitor is mounted on said tractor.

5. In the system of claim 4 wherein said seed planting mechanisms are spaced apart by a distance which creates a spacing x between adjacent sown seed rows in said field and said left and right row marker means are mounted on said planter so as to create row marks outward by a distance x/2 from the outboard left and right said sown seed crop rows, respectively.

6. A guidance system for visually displaying to an operator of a mobile farm implement an elongated indicating marking on the surface of a field in the form of a steering vector of a video monitor which displays the image viewed by a video camera mounted on said implement comprising: means mounted said video camera adjacent an outer edge of said implement with its optical axis directed forwardly and inclined at a slight angle to the horizontal so that it views the horizon and a substantial length of said indicating marking forward of said implement, whereby each scanning line of the raster below said horizon on said video monitor creates a different spot of the image of said substantial length of said indicating marking on said monitor and the multiplicity of said spots created by said scanning lines along a substantial height of said raster and up to said horizon forms a steering vector which indicates to said operator both the current position of said implement relative to said indicating marking and the direction said implement is to be steered for said implement to traverse the desired swath in order to maintain constant spacing between swaths of successive traverses of said field.

7. A method of operating a tractor having an operator's station and pulling a planter which sows seeds in a field in a plurality of parallel rows so as to traverse the field in successive swaths with said rows of successive swaths constantly and consistently spaced apart, the steps of tracing a row mark adjacent a first outer extremity of said planter each time it traverses said field from one end to the other, imaging during each traverse forwardly of said planter the horizon and a substantial length of a row mark traced during a previously traverse on a first video camera mounted adjacent the opposite outer extremity of said planter, and displaying the image of said substantial length of said row mark along a substantial height of the raster of a video monitor in the view of the tractor operator at the operator's station so that each scanning line of the monitor raster creates a different spot of the image of said substantial length of said row mark and the multiplicity of said spots forms a steering vector extending substantially to the horizon which indicates to said operator the direction said tractor is to be steered in order to traverse the desired swath.

8. In the method of claim 7 and including the steps of reversing the direction of said tractor pulling said planter 180° after each traverse of said field and again traversing said field while tracing a row mark adjacent said opposite outer extremity of said planter in unworked soil and imaging forwardly of said planter a substantial length of the row mark traced during said previous traverse on a second camera mounted adjacent said first outer extremity of said planter and displaying said image viewed by said second camera along a substantial height of the raster of said video monitor.

* * * * *

UNITED STATES PATENT OFFICE
CERTIFICATE OF CORRECTION

Patent No. 4,555,725   Dated November 26, 1985

Inventor(s) Allois F. Geiersbach and David L. Murray

It is certified that error appears in the above-identified patent and that said Letters Patent are hereby corrected as shown below:

Column 6, line 67, "is" should read "its"; (1st occurrence)

Column 7, line 28, "is" should read "it";

Column 7, line 38, "creased" should read "created";

Column 8, line 6, "mounted" should read "mounting".

Signed and Sealed this

Eleventh Day of February 1986

[SEAL]

Attest:

DONALD J. QUIGG

Attesting Officer      Commissioner of Patents and Trademarks